Aug. 13, 1940.  R. C. HOBSON  2,211,463
CAR TRUCK
Filed May 13, 1938  2 Sheets-Sheet 1

INVENTOR
Roy C. Hobson
BY Clarence Kerr
ATTORNEY

INVENTOR
Roy C. Hobson
BY
ATTORNEY

Patented Aug. 13, 1940

2,211,463

UNITED STATES PATENT OFFICE 2,211,463

CAR TRUCK

Roy C. Hobson, Cleveland Heights, Ohio, assignor to National Malleable and Steel Castings Company, Cleveland, Ohio, a corporation of Ohio Application May 13, 1938, Serial No. 207,656

25 Claims. (Cl. 105—197)

This invention pertains to car trucks and more particularly to novel spring suspension involving the use of rubber.

The present trend in railway car trucks employing coil springs, particularly those used in freight service, is to include devices in the spring suspension to prevent the build-up of oscillations of the springs to such a point as would result in damage to the lading. These stabilizing mechanisms include devices which may be substituted for one or more of the usual coil springs, and in other cases the truck is designed to include built-in friction mechanism to damp the oscillations of the springs. These arrangements are for the most part complicated and involve extra pieces added to the truck, and since they rely on friction for their snubbing action they will, of course, in time wear out.

I have found that by using rubber for the resilient means in the car truck to cushion movements of the bolster, the truck construction can be greatly simplified and a substantial number of parts eliminated. At the same time the resilient suspension can be made adequate to support the loads and prevent the build-up of undesirable oscillations of the bolster.

An object of my invention is the provision in a car truck of rubber means which alone supports the applied bolster load and having load travel characteristics which cushion movements between the bolster and side frame with the minimum amount of damage to the car lading. Another object of my invention is in the mounting of the resilient means so that the rubber is placed under combined shear and compression during downward movement of the bolster relative to the side frame. A still further object is a rubber cushion mounted on the side frame and cooperating with the bolster to normally maintain the bolster in central position with respect to the side frame and to prevent metal to metal contact between the side frame and bolster. Another object is to provide an arrangement whereby disassembly of the truck is readily accomplished without the necessity of removing the rubber from the side frame. Other objects and advantages of my invention will be better understood from a consideration of the following description and drawings, in which:

Figure 1:
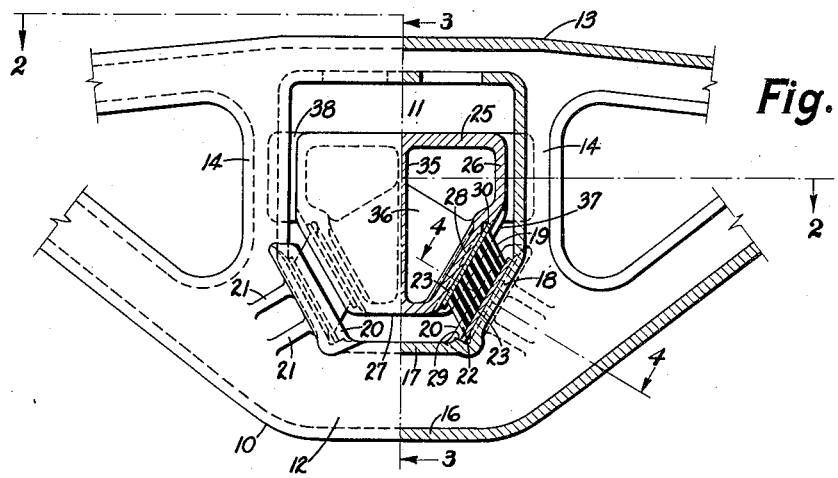
Figure 1 is an elevational view partly in section, of one side of a car truck embodying my invention, taken on line 1—1 of Fig. 2.
Figure 2:
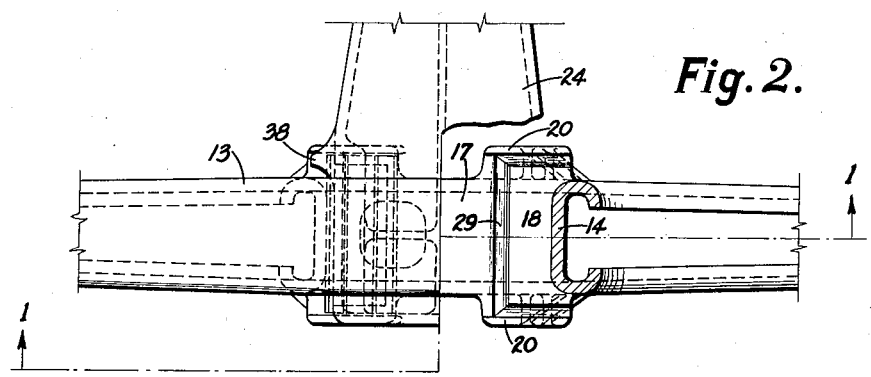
Figure 2 is a plan view partly in section, taken on line 2—2 of Fig. 1, one of the rubber units having been removed and with a portion of the bolster broken away.
Figure 3:
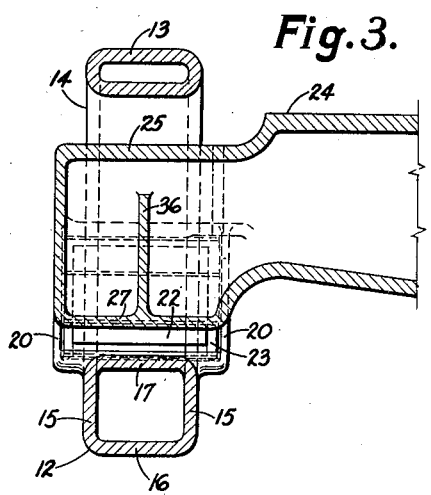
Figure 3 is a vertical sectional view taken on line 3—3 of Fig. 1.
Figure 4:
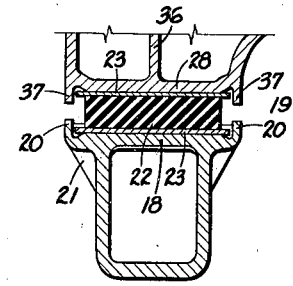
Figure 4 is a partial sectional view taken on line 4—4 of Fig. 1.

Referring to Figs. 1, 2, 3 and 4 there is shown a side frame 10 having a bolster receiving opening 11 formed by tension member 12, compression member 13 and vertical connecting columns 14. Tension member 12 below opening 11 is comprised of side walls 15, bottom wall 16, and horizontal top wall 17. Connecting top wall 17 with columns 14 are the sloping top walls 18 upon which rest the rubber units 19. Walls 18 extend laterally beyond side walls 15 and are provided with upstanding flanges 20 which serve to position the units laterally of the side frame. The lateral extensions of walls 18 are reinforced by ribs 21.

Each unit 19 is comprised of a rubber element 22 and plates 23 bonded to opposite sides thereof. The end portion of bolster 24 extends into opening 11 and is supported by said units. The end portion is comprised of top wall 25, side walls 26, bottom wall 27, and upwardly diverging walls 28 corresponding in slope to top walls 18 of the side frame. At the junctions of top wall 17 with each of sloping walls 18 there is provided a shoulder 29 which serves as an abutment for the end of the lower plate 23 of each unit. Similar shoulders 30 are provided in walls 28 of the bolster and contact the ends of the upper plates 23 of each unit. Connecting top wall 25 and bottom wall 27 is the vertical central web 35. Reinforcing diverging walls 28 are the transverse vertical webs 36 connecting said walls to central web 35. Vertical flanges 37 extend downwardly from walls 28 into overlapping relation with upper plates 23 of the units and thus position the rubber units with respect to the bolster. Lateral movement between the bolster and side frame is limited by the projections 38 which are adapted to bear against the inner sides of columns 14.

When a load is applied to the bolster a combined compression and shearing stress is set up in the resilient units. Due to the absorption of energy in the rubber, the build-up of detrimental oscillations of the bolster is effectively prevented. Longitudinal movements of the bolster relative to the side frame, such as occur during sudden starting of the car or during brake applications, are resisted by one of the resilient units in each side frame, depending on the direction of said longitudinal movement. Furthermore, movement of the bolster laterally of the side frame is resisted by the rubber units after plates 23 have been moved into engagement with flanges 37 of the bolster and flanges 20 of the side frame. Greater than normal lateral thrusts will of course be taken by projections 38 against columns 14. Any angular or torsional movements between the bolster and side frames are also resisted by the rubber units. Thus, when the side frames and bolster are moved out of square, as when passing around curves, a portion of each unit is compressed so that when a stretch of straight track is again entered the bolster and frames will be returned to normal position by the restoring forces previously set up due to the compression of the rubber. In short, the resilient units cushion relative movements in any direction between the bolster and side frame and tend to restore these parts to their normal positions after the forces causing the movements have ceased.

The flanges 37 on the bolster are so spaced from flanges 20 on the side frame as to engage said latter flanges under abnormally severe vertical loads, thus protecting the rubber units against over-solid blows in a vertical direction. The units are protected against over-solid blows in a direction longitudinally of the side frame by engagement of side walls 26 of the bolster with columns 14.

Figure 5:
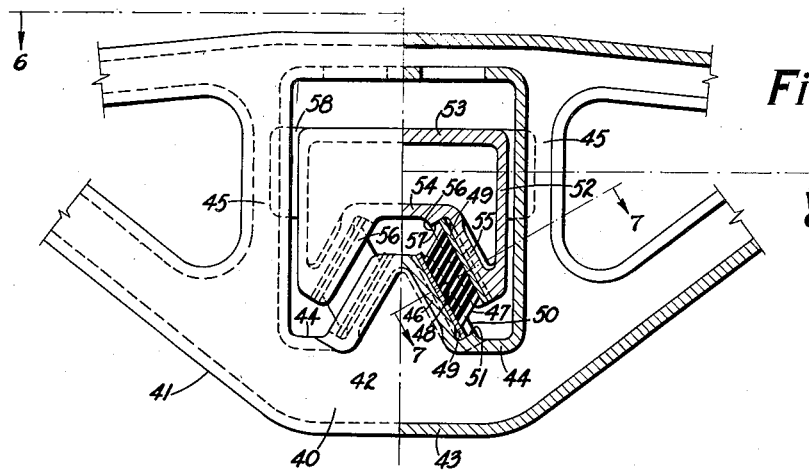
Figure 5 is a view corresponding to Fig. 1 of another embodiment of my invention, taken on line 5—5 of Fig. 6.
Figure 6:
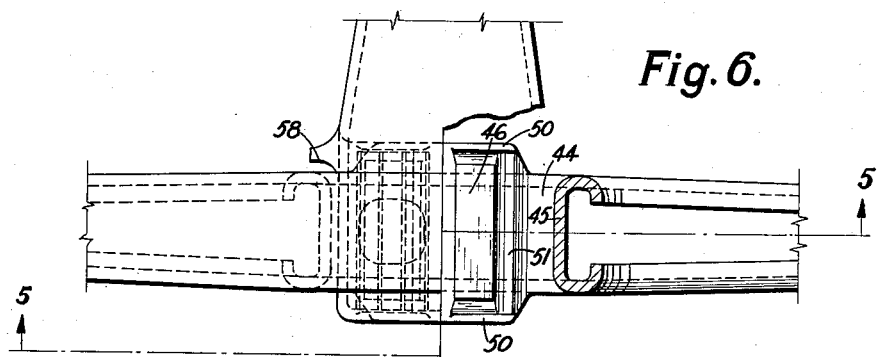
Figure 6 is a plan view partly in section, taken on line 6—6 of Fig. 5, with one of the rubber units removed and with a portion of the bolster broken away.
Figure 7:
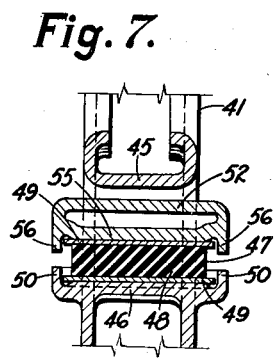
Figure 7 is a partial sectional view, taken on line 7—7 of Fig. 5.

In Figs. 5, 6 and 7 there is shown another embodiment of my invention wherein the tension member 40 of side frame 41 below the bolster receiving opening is comprised of side walls 42, bottom wall 43, top horizontal walls 44 adjacent columns 45, and top converging walls 46 which meet on the transverse center plane of the frame. Rubber units 47 are similar to those described in the preceding embodiment, and comprise a rubber element 48 and top and bottom plates 49 bonded thereto. The units rest on walls 46 which extend beyond side walls 41 of the frame and are positioned laterally thereof by the upstanding end flanges 50. At the junctures of horizontal portions 44 and converging portions 46 there is provided a shoulder 51 which serves as an abutment for lower plate 49 of each unit. The bolster end portion supported by said units is comprised of side walls 52, top wall 53, horizontal bottom wall 54, and downwardly converging bottom walls 55 which merge with said side walls. The bolster is also provided with flanges 56 which extend downwardly into overlapping relation with upper plates 49 of the units and position the bolster laterally in relation to the side frame. Abutments 57 are provided on the bolster to prevent upward movement of plates 49. To limit lateral movement of the bolster with respect to the side frame the bolster has projections 58 adapted to engage the inner sides of the columns 45. Normally, lateral movement of the bolster is resisted by the rubber units after plates 49 are in engagement with flanges 56 on the bolster and flanges 50 on the side frame. As in the preceding embodiment the rubber units are protected against over-solid blows in a vertical direction by flanges 50 and 56 and in a direction longitudinally of the bolster by engagement of bolster side walls 52 with columns 45.

Figure 8:
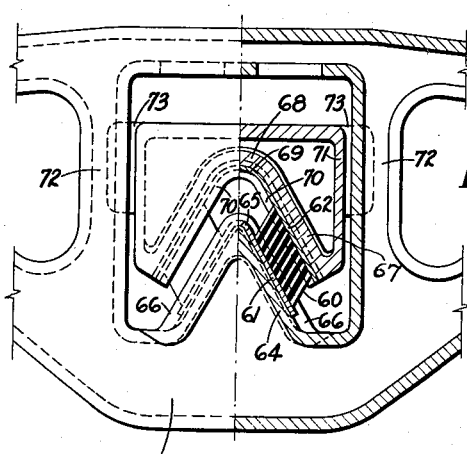
Figure 8 is a side elevational view partly in section of another embodiment of my invention.

In Fig. 8 is shown a further embodiment of my invention wherein the separate rubber units are combined into a single unit comprising rubber elements 60 joined by bottom plate 61 and top plate 62, each of which is bonded to said elements. The central portion 63 of the tension member of the side frame is similar to that of the preceding embodiment; however, the upwardly converging walls 64, which meet on the transverse center plane of the frame, are rounded at their junctures so as to provide a bearing surface for the curved portion 65 of lower plate 61 of the unit. The walls are also provided with upstanding end flanges 66 to keep the unit positioned laterally of the side frame. The bolster end portion is provided with upwardly converging walls 67 corresponding in slope to walls 64 of the side frame, the juncture of said walls being curved, as at 68, to correspond to the curved portion 69 of upper plate 62 of the unit. The bolster is also provided with flanges 70 which extend downwardly therefrom into overlapping relation with plate 62 and thus serve to keep the bolster positioned laterally in relation to the frame. As in the preceding embodiments, bolster flanges 70 and side frame flanges 66 are so spaced as to come into engagement during abnormal vertical blows to prevent injury to the rubber elements. Abnormal longitudinal thrusts of the bolster are absorbed by engagement of side walls 71 of the bolster with columns 72. Normal lateral movements of the bolster with respect to the side frame are resisted by the unit while abnormal movements are limited by projections 73 which are adapted to engage the inner sides of the columns.

To dismantle the side frame in any of the embodiments herein shown, the bolster is first jacked up sufficiently so that the bolster flanges clear the tops of the rubber units, and then after the usual wedges and brasses in the journal boxes at each end of the side frame have been removed, the side frame may be withdrawn from the bolster without removing the units.

While my invention has been described in connection with only one side frame and associated end of the bolster, it will be understood that in each case a similar side frame at the opposite end of the bolster cooperates therewith in a like manner to that described.

The angle between the rubber units may be varied to obtain different load travel characteristics. The angle in any given case will be determined by the hardness of the rubber used. With rubber of 65 durometer hardness the angle has been found to vary from approximately 60° to 70° for the same travel of the bolster under various loads, such as would be applied to freight cars having capacities from 40 to 70 tons. The smaller angle would be used on cars having the lower capacity and the angle would be increased on the higher capacity cars. Further variations may be made in the resilient units by substituting different hardnesses of rubber to increase or decrease the stiffness thereof. Moreover, the opposite sides of the rubber units need not be parallel but may be at an angle to each other in which case the plates bonded to these sides will also diverge or converge as the case may be. When the plates of the resilient units are angularly arranged with respect to each other, the sloping walls on the bolster and side frame should be changed accordingly.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car truck, a side frame having a window opening, a bolster extending into said opening, rubber means on said side frame, said means comprising separate blocks of rubber each having plane surfaces sloping longitudinally of said side frame and engaging correspondingly sloping surfaces on said side frame and bolster for supporting the latter.

2. In a car truck, a side frame having a window opening, a bolster extending into said opening, rubber means on said frame, said means comprising separate blocks of rubber each having plane surfaces sloping longitudinally of said side frame and engaging correspondingly sloping surfaces on said side frame and bolster, said means being adapted to simultaneously receive both compression and shearing stresses for supporting the bolster.

3. In a car truck, a side frame having a window opening, a bolster extending into said opening, rubber means on said side frame comprising separate blocks of rubber having plane surfaces positioned at an acute angle with the transverse center plane of said side frame and engaging correspondingly positioned walls on said bolster for supporting the latter.

4. In a car truck, a side frame member having a window opening, a bolster member extending into said opening, one of said members having walls sloping at an acute angle to the transverse center plane of said side frame and forming a pocket, the other of said members having sloping walls spaced from said first named walls and forming a projection extending into said pocket, and rubber means on said side frame between said walls, said means being adapted to simultaneously receive both compression and shearing stresses for supporting said bolster.

5. In a car truck, a side frame member having tension and compression elements and columns forming a window opening, a bolster member extending into said opening, one of said members having walls sloping longitudinally of said side frame member and forming a pocket, the other of said members having sloping walls forming a projection extending into said pocket, and rubber means engaging said walls for supporting said bolster member on said side frame member, means on said members adapted to cooperate with said rubber means to enable the latter to cushion movement of said bolster member laterally of said side frame member.

6. In a car truck, a side frame member having tension and compression elements and columns forming a window opening, a bolster member extending into said opening, one of said members having walls sloping longitudinally of said side frame member and forming a pocket, the other of said members having sloping walls forming a projection extending into said pocket, and rubber means engaging said walls for supporting said bolster member on said side frame member, said bolster member being adapted to compress said rubber means for cushioning movement of said bolster member longitudinally of said side frame member.

7. In a car truck, a side frame member having tension and compression elements and columns forming a window opening, a bolster member extending into said opening, one of said members having walls sloping longitudinally of said side frame member and forming a pocket, the other of said members having sloping walls forming a projection extending into said pocket, and rubber means engaging said walls for supporting said bolster member on said side frame member, said rubber means being adapted to cooperate with said members for cushioning movement of said bolster member laterally and longitudinally of said side frame member.

8. In a car truck, a side frame member and a bolster member, said side frame member comprising tension and compression elements and columns forming a window opening, and said bolster member having an end extending into said opening, one of said members having walls sloping longitudinally of said side frame member and forming a pocket, the other of said members having sloping walls forming a projection extending into said pocket, and rubber means engaging said walls for supporting said bolster on said side frame.

9. In a car truck, a side frame having tension and compression members and columns forming a window opening, a bolster extending into said opening, means on said side frame projecting into said opening comprising walls sloping longitudinally of said side frame, said bolster having sloping walls spaced from said first named walls, certain of said walls forming a pocket and others of said walls forming a projection extending into said pocket, and rubber means between said walls acting in combined compression and shear for supporting said bolster.

10. In a car truck, a side frame having tension and compression members and columns forming a window opening, a bolster in said opening, said tension member having walls sloping upwardly towards the transverse center plane of said side frame, and rubber means between said walls and bolster and acting in combined compression and shear for supporting said bolster.

11. In a car truck, a side frame having tension and compression members and columns forming a window opening, a bolster in said opening, said tension member having walls sloping upwardly towards the transverse center plane of said side frame, said bolster having walls converging upwardly toward the transverse center plane of said side frame, and rubber means between said side frame walls and said bolster walls and acting in combined compression and shear for supporting said bolster.

12. A side frame for car truck comprising tension and compression members and columns, said tension member having a pair of walls sloping longitudinally thereof at an acute angle to each other, said walls being constructed and arranged to receive rubber means for supporting a bolster when the latter is assembled with said side frame, and stop means extending adjacent said walls adapted to limit downward movement of said rubber means relative to said walls.

13. A side frame for car truck comprising tension and compression members and columns forming a bolster receiving opening therebetween, said tension member below said opening having a pair of sloping walls extending upwardly therefrom and merging on the transverse center plane of said frame, said walls being constructed and arranged to receive rubber means for supporting a bolster when the latter is assembled with said side frame.

14. A side frame for car truck comprising tension and compression members and columns forming a bolster receiving opening therebetween said tension member having a pair of longitudinally extending walls sloping upwardly therefrom at an acute angle to each other toward the ends of said side frame and merging with said columns, said walls being constructed and arranged to receive rubber means for supporting a bolster when the latter is assembled with said side frame, and stop means extending adjacent said walls adapted to limit downward movement of said rubber means relative to said walls.

15. In a car truck, a side frame having a tension member, said member having plane surfaced walls sloping upwardly and toward the ends of said side frame, a bolster having plane surfaced walls corresponding in slope to said first-named walls, and rubber means having plane surfaces interposed between said tension member and bolster walls and acting in combined compression and shear for supporting said bolster.

16. In a car truck, a side frame having tension and compression members and columns forming a window opening, a bolster in said opening, said tension member having a pair of longitudinally extending plane surfaced walls sloping upwardly therefrom toward the ends of said side frame and merging with said columns, and a pair of oppositely sloping rubber blocks between said walls and bolster and acting in combined compression and shear for supporting said bolster.

17. In a car truck, a side frame having tension and compression members and columns forming a window opening, a bolster in said opening, said tension member having a pair of longitudinally extending plane surfaced walls sloping upwardly therefrom toward the ends of said side frame and merging with said columns, said bolster having plane surfaced walls correspondingly sloped to said tension member walls, and rubber means having plane surfaces between said tension member walls and said bolster walls and acting in combined compression and shear for supporting said bolster.

18. In a car truck, a side frame having a tension member, said member having longitudinally sloping walls converging on the transverse center plane of said side frame, a bolster, and unitary rubber means substantially V-shaped in section and in engagement with said walls for supporting said bolster.

19. In a car truck, a side frame having a tension member, said member having longitudinally sloping walls converging on the transverse center plane of said side frame, the juncture of said walls being rounded, a bolster having walls diverging upwardly toward the longitudinal center plane thereof and connected at their top by a curved wall, and unitary rubber means in engagement with said tension member walls and said bolster walls and adapted to cushion movements of said bolster.

20. In a car truck, a side frame having tension and compression members and columns forming a window opening, a bolster in said opening, a projection extending upwardly from said tension member into said window opening, and unitary rubber means substantially V-shaped in cross-section resting on said projection and adapted to support said bolster.

21. In a car truck, a side frame having tension and compression members and columns forming a window opening, said tension member having plane surfaced walls sloping upwardly longitudinally of said side frame, a bolster in said opening having oppositely sloping plane surfaced walls spaced from said tension member walls, rubber means between said walls for supporting said bolster, and means comprising surfaces adjacent the sloping walls of said bolster and side frame respectively for positioning said rubber means and for protecting said rubber means against over-solid blows.

22. A car truck bolster comprising top, bottom, and side walls, an end portion of said bolster having walls diverging upwardly from said bottom wall and merging with said side walls, abutment means at the junctures of said diverging walls and said side walls, said diverging walls and abutments being adapted to receive a rubber unit forming the sole support for said bolster when the latter is assembled with a side frame.

23. A car truck bolster having an end portion comprising top, bottom, and side walls, said bottom wall having portions sloping upwardly toward a central vertical plane extending longitudinally of said bolster, said portions being adapted to receive a rubber unit therebetween for supporting said bolster on a side frame.

24. A car truck bolster having an end portion comprising top, bottom, and side walls, said bottom wall having portions sloping upwardly toward a central vertical plane extending longitudinally of said bolster and merged at their upper ends by a curved portion to form a pocket, said pocket being adapted to receive cushioning means therein for supporting said bolster on a side frame.

25. A car truck bolster having an end portion comprising top, bottom, and side walls, said bottom wall having portions sloping transversely of said bolster and adapted to cooperate with rubber means forming the sole support for said bolster when the latter is assembled with a side frame, and flanges on said portions projecting therebeyond and adapted to position the rubber means.

ROY C. HOBSON.